(12) United States Patent
Yuan et al.

(10) Patent No.: US 12,722,678 B1
(45) Date of Patent: Sep. 1, 2026

(54) SIMPLIFIED FOLD-IN-HALF WAGON

(71) Applicant: Kaijing Yuan, Jinhua (CN)

(72) Inventors: Kaijing Yuan, Jinhua (CN); Yiheng Yuan, Jinhua (CN); Bangjie Yuan, Jinhua (CN); Wenkai Yang, Jinhua (CN)

(73) Assignee: Kaijing Yuan, Jinhua (CN)

( * ) Notice: Subject to any disclaimer, the term of this patent is extended or adjusted under 35 U.S.C. 154(b) by 0 days.

(21) Appl. No.: 19/536,240

(22) Filed: Feb. 11, 2026

Related U.S. Application Data

(63) Continuation of application No. PCT/CN2026/071128, filed on Jan. 7, 2026.

(30) Foreign Application Priority Data

Jan. 7, 2025 (CN) ......................... 202520037233.2

(51) Int. Cl.
*B62B 3/02* (2006.01)
*B62B 3/00* (2006.01)

(52) U.S. Cl.
CPC .............. *B62B 3/007* (2013.01); *B62B 3/025* (2013.01); *B62B 2205/18* (2013.01)

(58) Field of Classification Search
CPC ........... B62B 3/007; B62B 3/025; B62B 3/02; B62B 2205/18
See application file for complete search history.

(56) References Cited

U.S. PATENT DOCUMENTS

| | | | | |
|---|---|---|---|---|
| 12,344,299 | B1 * | 7/2025 | Wu | B62B 3/007 |
| 2025/0171065 | A1 * | 5/2025 | Chen | B62B 5/067 |
| 2025/0171066 | A1 * | 5/2025 | Chen | B62B 5/065 |
| 2025/0319921 | A1 * | 10/2025 | Chen | B62B 3/025 |
| 2025/0368243 | A1 * | 12/2025 | Yang | B62B 3/007 |

FOREIGN PATENT DOCUMENTS

| | | | | |
|---|---|---|---|---|
| CN | 118124649 | A * | 6/2024 | B62B 5/00 |

* cited by examiner

*Primary Examiner* — John D Walters

(57) ABSTRACT

A simplified fold-in-half wagon includes four corner columns and side frames composed of two parallelogram mechanisms arranged between two hinge bases located on left and right sides of the wagon. Adjacent inner ends of the two parallelogram mechanisms are hingedly connected by an intermediate supporting base and outer ends of the two parallelogram mechanisms are hinged to respective hinge bases. Each parallelogram mechanism includes an upper connecting rod and a lower connecting rod arranged apart from each other. Each hinge base is provided with a first upper support surface and a first lower support surface at outer ends of the upper connecting rod and the lower connecting rod. Each of a front side and a rear side of each intermediate supporting base is provided with a second upper support surface and a second lower support surface at inner ends of the upper connecting rod and the lower connecting rod.

10 Claims, 7 Drawing Sheets

SIMPLIFIED FOLD-IN-HALF WAGON

CROSS-REFERENCE TO RELATED APPLICATIONS

The present disclosure is a Continuation Application of PCT Application No. PCT/CN2026/071128, filed on Jan. 7, 2026, which claims priority to Chinese Utility Model application No. 202520037233.2, filed on Jan. 7, 2025, the entire contents of which are hereby incorporated by reference.

TECHNICAL FIELD

The present disclosure relates to the technical field of folding wagons, and in particular to a simplified fold-in-half wagon.

BACKGROUND

In outdoor leisure activities for example, small wagons used for carrying goods are very important tools. For ease of use, such wagons are usually designed to be foldable, which results in relatively complex structures.

In the prior art, it proposed a heavy-load folding wagon in Chinese Patent Application Publication No. CN 118124649 A. The technical problem addressed by this heavy-load folding wagon is to overcome the defects of existing folding wagons having small load capacity and small volume, and being monofunctional, rather than to simplify the structure. Therefore, the heavy-load folding wagon eliminates side frames and instead provides two parallel first support cross beams on a bottom frame. Each first support cross beam includes a first parallelogram rod group, a second parallelogram rod group, and a connecting base located between the first parallelogram rod group and the second parallelogram rod group. One end of the first parallelogram rod group is hinged to a corresponding wheel assembly, and the other end of the first parallelogram rod group is hinged to one side of the connecting base. One end of the second parallelogram rod group is hinged to a corresponding wheel assembly, and the other end of the second parallelogram rod group is hinged to the other side of the connecting base. Therefore, the technical solution has the following advantages: 1) Through cooperation of the first parallelogram rod group, the second parallelogram rod group, and the connecting base, when the first support cross beam is unfolded, an upper support rod is stacked and abutted on a lower support rod to form a double-rod structure, which effectively increases the strength of the support cross beam and thereby increases the load capacity of the wagon. Reinforcing components are further provided to further increase the load capacity, resulting in a stable and reliable structure. The strength of the support cross beam is increased without affecting the folding function of the bottom frame assembly, making the wagon convenient to use. 2) Because the strength of the support cross beam is increased, the wagon does not require traditional foldable side frame assemblies on both sides. In addition, the side frame and a handle assembly can be opened outward, forming a fully open wagon. On the one hand, the size limitation for loading items is small, the overall loading capacity is larger, and loading is more convenient. On the other hand, the wagon can be used as a chair or a bed, and is also convenient for pets to get on and off, greatly improving its functionality. 3) After folding, the overall size is small, which facilitates storage and placement.

From the above, it can be seen that, in order to increase the supporting strength in an unfolded state, the upper support rod is stacked and abutted on the lower support rod to form a double-rod structure, such that the side height is only the height of the first support cross beam. In addition, in order to increase the load capacity of the wagon, one end of the first parallelogram rod group is hinged to a corresponding wheel assembly, and the other end of the first parallelogram rod group is hinged to one side of the connecting base; and one end of the second parallelogram rod group is hinged to a corresponding wheel assembly, and the other end of the second parallelogram rod group is hinged to the other side of the connecting base. That is, both ends of the two first support cross beams are respectively hinged to and supported by four wheels, resulting in a configuration in which the wheel assemblies cannot be independently arranged and must be provided in association with the first support cross beams.

The present disclosure proposes a simplified fold-in-half wagon, which not only has a certain side height and does not require four wheels provided in association with the support cross beams, but also adopts a new supporting solution to obtain relatively high supporting strength.

SUMMARY

The main objective of the present disclosure is to provide a simplified fold-in-half wagon, which not only has a certain side height and does not require four wheels provided in association with the support cross beams, but also adopts a new supporting solution to achieve relatively high supporting strength.

The simplified fold-in-half wagon provided including four corner columns disposed at four corners of the wagon, the four corner columns including a first corner column, a second corner column, a third corner column, and a fourth corner column sequentially arranged along a circumferential direction of a bottom frame.

The first corner column and the second corner column located at a front side of the wagon serve as two side rods of a front frame, and the third corner column and the fourth corner column located at a rear side of the wagon serve as two side rods of a rear frame.

Each of the four corner columns is provided with a hinge base at a lower end, and the wagon further includes a left side frame and a right side frame.

The left side frame composed of two parallelogram mechanisms that are arranged one after another in a direction from front to rear is provided between two of the hinge bases located on a left side of the wagon, the right side frame composed of two parallelogram mechanisms that are arranged one after another in the direction from front to rear is provided between other two of the hinge bases located on a right side of the wagon, adjacent inner ends of the two parallelogram mechanisms are hinged by an intermediate supporting base, outer ends of the two parallelogram mechanisms are respectively hinged to respective hinge bases, and each parallelogram mechanism includes an upper connecting rod and a lower connecting rod arranged apart from each other.

Four vertexes of each parallelogram mechanism are hinged about a first hinge axis, a second hinge axis, a third hinge axis and a fourth hinge axis respectively.

Each hinge base is provided with a first upper support surface at an outer end of the upper connecting rod of a corresponding parallelogram mechanism and a first lower support surface at an outer end of the lower connecting rod of the corresponding parallelogram mechanism, such that at least one of the following is caused when the corresponding parallelogram mechanism is unfolded and arranged horizontally: the first upper support surface abuts against a lower surface of the upper connecting rod located on an inner side of a first hinge axis to prevent the upper connecting rod from swinging downwardly further during unfolding of the corresponding parallelogram mechanism, thereby providing unfolding support; the first lower support surface abuts against an upper surface of the upper connecting rod located on an outer side of the first hinge axis to prevent a tail end of the upper connecting rod from swinging upwardly further during unfolding of the corresponding parallelogram mechanism, thereby preventing further downward swinging of the upper connecting rod to provide unfolding support; the first upper support surface abuts against a lower surface of the lower connecting rod located on an inner side of a second hinge axis to prevent the lower connecting rod from downwardly swinging further during unfolding of the corresponding parallelogram mechanism, thereby providing unfolding support; and the first lower support surface abuts against an upper surface of the lower connecting rod located on an outer side of the second hinge axis to prevent a tail end of the lower connecting rod from upwardly swinging further during unfolding of the corresponding parallelogram mechanism, thereby preventing further downward swinging of the lower connecting rod to provide unfolding support.

Each of a front side and a rear side of each intermediate supporting base is provided with a second upper support surface at an inner end of the upper connecting rod of a corresponding parallelogram mechanism and a second lower support surface at an inner end of the lower connecting rod of the corresponding parallelogram mechanism, such that at least one of the following is caused when the corresponding parallelogram mechanism is unfolded and arranged horizontally: the second upper support surface abuts against a lower surface of the upper connecting rod located on an inner side of a third hinge axis to prevent the inner end of the upper connecting rod from downwardly swinging further during unfolding of the corresponding parallelogram mechanism to provide unfolding support; the second lower support surface abuts against an upper surface of the upper connecting rod located on an outer side of the third hinge axis to prevent a portion of the upper connecting rod located on the outer side of the third hinge axis from upwardly swinging further relative to the second lower support surface during unfolding of the corresponding parallelogram mechanism, thereby preventing further downward swinging of the upper connecting rod to provide unfolding support; the second upper support surface abuts against a lower surface of the lower connecting rod located on an inner side of a fourth hinge axis to prevent the inner end of the lower connecting rod from downwardly swinging further during unfolding of the corresponding parallelogram mechanism to provide unfolding support; and the second lower support surface abuts against an upper surface of the lower connecting rod located on an outer side of the fourth hinge axis to prevent a portion of the lower connecting rod located on the outer side of the fourth hinge axis from upwardly swinging further relative to the second lower support surface during unfolding of the corresponding parallelogram mechanism, thereby preventing further downward swinging of the lower connecting rod to provide unfolding support.

In some embodiments, each hinge base is provided with a first support portion disposed between the outer end of the upper connecting rod and the outer end of the lower connecting rod of the corresponding parallelogram mechanism, an upper end of the first support portion provides the first upper support surface, and a lower end of the first support portion provides the first lower support surface.

Each of the front side and the rear side of each intermediate supporting base is provided with a second support portion disposed between the inner end of the upper connecting rod and the inner end of the lower connecting rod of the corresponding parallelogram mechanism, an upper end of the second support portion provides the second upper support surface, and a lower end of the second support portion provides the second lower support surface.

In some embodiments, the first support portion is configured as a first vertical block arranged in the direction from front to rear between the first hinge axis and the second hinge axis, and the second support portion is configured as a second vertical block arranged in the direction from front to rear between the third hinge axis and the fourth hinge axis.

In some embodiments, the first vertical block is fixedly connected to or integrally formed with a corresponding hinge base, and the second vertical block is fixedly connected to or integrally formed with a corresponding intermediate supporting base.

In some embodiments, each of a front end and a rear end of each intermediate supporting base is provided with a blocking portion on an upper side, and a lower end of the blocking portion provides the second lower support surface.

In some embodiments, each intermediate supporting base is provided a synchronizing gear between any adjacent inner ends of the two parallelogram mechanisms, such that the two parallelogram mechanisms are synchronously unfoldable and foldable via the synchronizing gear.

In some embodiments, the bottom frame includes a first bottom support rod including one or more first cross beams, one end of each first cross beam is connected to a lower connecting rod located adjacent to the front frame on the left side of the wagon, and an other end of each first cross beam is connected to a lower connecting rod located adjacent to the front frame on the right side of the wagon.

The bottom frame further includes a second bottom support rod including one or more second cross beams, one end of each second cross beam is connected to a lower connecting rod located adjacent to the rear frame on the left side of the wagon, and an other end of each second cross beam is connected to a lower connecting rod located adjacent to the rear frame on the right side of the wagon.

In some embodiments, one or more first longitudinal beams are provided between adjacent first cross beams, and one or more second longitudinal beams are provided between adjacent second cross beams.

In some embodiments, a front-bottom cross beam is provided between the first corner column and the second corner column, and the front-bottom cross beam is provided with front ground wheels; and/or a rear-bottom cross beam is provided between the third corner column and the fourth corner column, and the rear-bottom cross beam is provided with rear ground wheels.

In some embodiments, a front-top cross beam is provided between the first corner column and the second corner column, and the front-top cross beam, the first corner column, the second corner column, and the front-bottom cross beam form the rectangular front frame.

A rear-top cross beam is provided between the third corner column and the fourth corner column, the rear-top cross beam, the third corner column, the fourth corner column, and the rear-bottom cross beam form the rectangular rear frame.

After adopting the above structure, compared with the prior art, the present disclosure has the following advantages. Through structural design, hinge bases are provided at lower ends of four corner columns. Side frames each composed of two parallelogram mechanisms arranged in a direction from front to rear are respectively provided between two hinge bases on a left side of the wagon and between two hinge bases on a right side of the wagon. Adjacent inner ends of the two parallelogram mechanisms are hingedly connected by an intermediate supporting base, and outer ends of the two parallelogram mechanisms are respectively hinged to corresponding hinge bases. In addition, each hinge base is provided with a first upper support surface and a first lower support surface at outer ends of the upper connecting rod and the lower connecting rod. Both a front side and a rear side of each intermediate supporting base are provided with a second upper support surface and a second lower support surface at inner ends of the upper connecting rod and the lower connecting rod. Therefore, when the parallelogram mechanisms are unfolded into a flat state, multiple supporting points are formed by the four hinge bases and the two intermediate supporting bases. Moreover, since the four hinge bases provide supporting, loads borne by the two intermediate supporting bases are able to be further distributed to the four hinge bases, such that the four hinge bases and the two intermediate supporting bases together form multiple supporting points which are organically connected and extend around a circumferential direction of the bottom frame of the wagon. For example, up to sixteen supporting points can be formed along the circumferential direction of the bottom frame. As a result, on one hand, a relatively high supporting strength can be obtained, and on the other hand, requirements on material thickness of rods in the parallelogram mechanisms can be reduced, thereby achieving weight reduction without affecting supporting performance.

Meanwhile, since hinge bases are provided at the lower ends of the four corner columns, the wagon does not need to arrange four wheels associated with the support cross beams. In addition, because the new supporting solution does not require an upper support rod to be stacked and abutted on a lower support rod to form a double-rod structure, and because an interval is provided between the upper and lower connecting rods of each parallelogram mechanism, a certain side height can be achieved.

Figure 1:
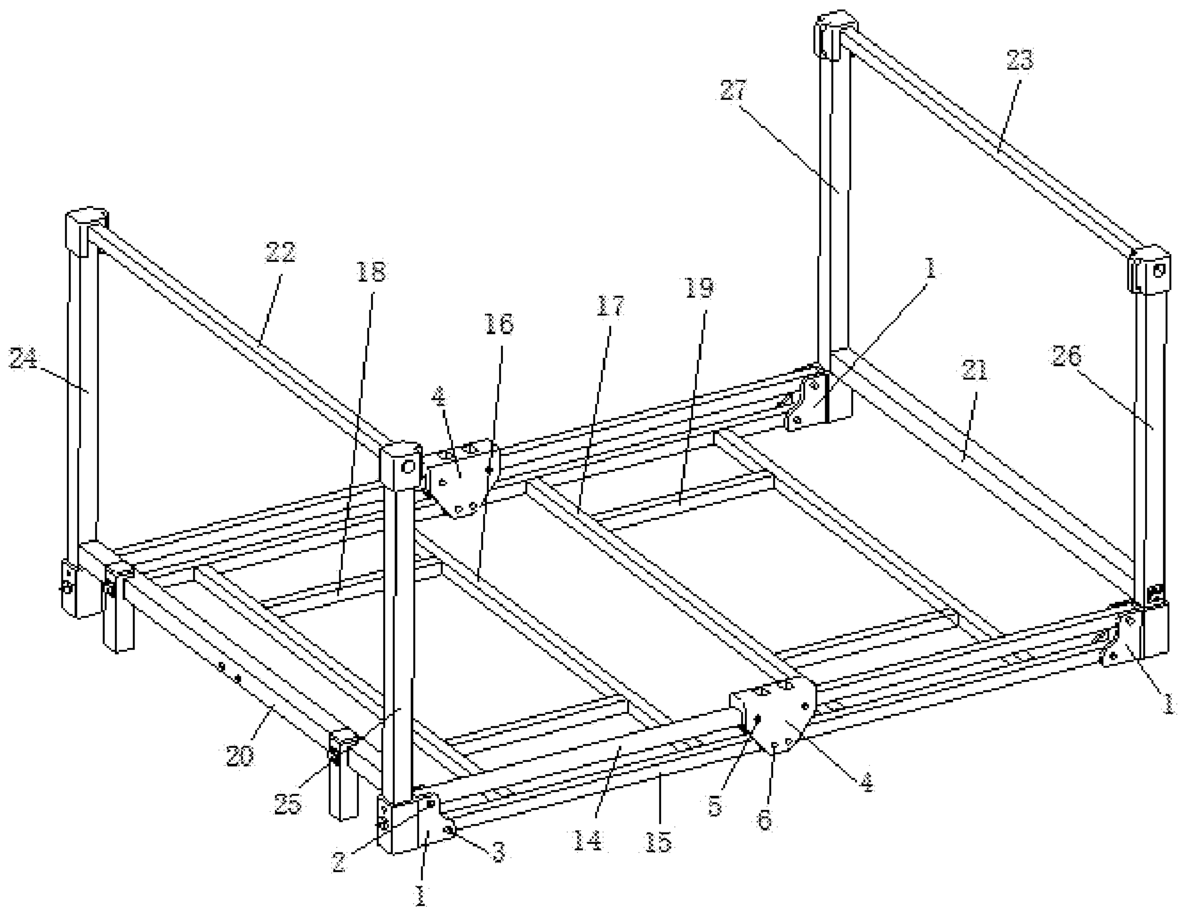
FIG. 1 is a perspective schematic view of a simplified fold-in-half wagon according to the present disclosure in an unfolded state.

Reference numerals: 1. hinge base; 2. first hinge axis; 3. second hinge axis; 4. intermediate supporting base; 5. third hinge axis; 6. fourth hinge axis; 7. first upper support surface; 8. first lower support surface; 9. second upper support surface; 10. second lower support surface; 11. strap; 12. blocking portion; 13. synchronizing gear; 14. upper connecting rod; 15. lower connecting rod; 16. first cross beam; 17. second cross beam; 18. first longitudinal beam; 19. second longitudinal beam; 20. front-bottom cross beam; 21. rear-bottom cross beam; 22. front-top cross beam; 23. rear-top cross beam; 24. first corner column; 25. second corner column; 26. third corner column; 27. fourth corner column; 28. fabric basket; 29. front ground wheel; 30. rear ground wheel; 31. first vertical block; 32. second vertical block; 33. handle.

DESCRIPTION OF EMBODIMENTS

The following description is provided to disclose the present disclosure in such a manner that those skilled in the art can make and use the present disclosure. The embodiments described below are merely examples, and other obvious variations may be conceived by those skilled in the art. The basic principles of the present disclosure defined in the following description may be applied to other embodiments, modifications, improvements, equivalent solutions, and other technical solutions without departing from the spirit and scope of the present disclosure.

Those skilled in the art should understand that, in the present disclosure, the terms “longitudinal”, “transverse/cross”, “upper”, “lower”, “front”, “rear”, “left”, “right”, “vertical”, “horizontal”, “top”, “bottom”, “inner”, and “outer” indicate orientations or positional relationships based on the orientations or positional relationships shown in the drawings. These terms are used merely for convenience of description and to simplify the description, rather than to indicate or imply that the device or element must have a particular orientation, be constructed in a particular orientation, or be operated in a particular orientation. Therefore, these terms should not be construed as limiting the present disclosure.

It should be understood that the term “one” is to be construed as “at least one” or “one or more.” That is, in one embodiment, the number of an element may be one, while in another embodiment, the number of the element may be more than one. The term “one” should not be construed as limiting the quantity.

As shown in FIGS. 1 to 7, the present disclosure provides a simplified fold-in-half wagon, which includes four corner columns disposed at four corners of the folding wagon. The four corner columns are sequentially arranged along a circumferential direction of a bottom frame as a first corner column 24, a second corner column 25, a third corner column 26, and a fourth corner column 27. The first corner column 24 and the second corner column 25 located at a front side of the folding wagon serve as two side rods of a front frame, and the third corner column 26 and the fourth corner column 27 located at a rear side of the folding wagon serve as two side rods of a rear frame.

In this embodiment, the front frame is configured as a rectangular structure. Specifically, a front-top cross beam 22 is disposed between the first corner column 24 and the second corner column 25, and the front-top cross beam 22, the first corner column 24, the second corner column 25, and a front-bottom cross beam 20 together form a rectangular front frame. A rear-top cross beam 23 is disposed between the third corner column 26 and the fourth corner column 27, and the rear-top cross beam 23, the third corner column 26, the fourth corner column 27, and a rear-bottom cross beam 21 together form a rectangular rear frame.

Certainly, the front frame and the rear frame may also adopt other structures, such as an X-shaped front frame, an X-shaped rear frame, a U-shaped front frame, a U-shaped rear frame, or a single-crossbar square front frame and a single-crossbar square rear frame, and the like.

Figure 3:
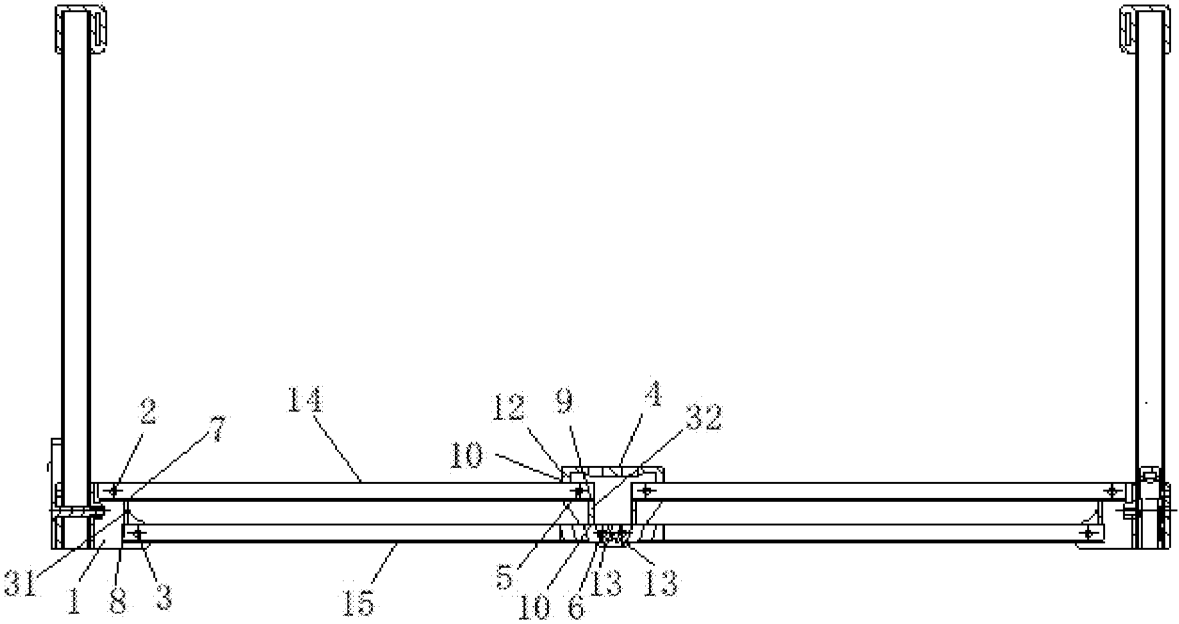
FIG. 3 is a cross-sectional view of the simplified fold-in-half wagon taken along a line A-A.

As shown in FIGS. 1 and 3, lower ends of the four corner columns are respectively provided with hinge bases 1. Between two hinge bases 1 located on a left side of the folding wagon and between two hinge bases 1 located on a right side of the folding wagon, a side frame composed of two parallelogram mechanisms arranged in a direction from front to rear is provided. Adjacent inner ends of the two parallelogram mechanisms are hinged to each other through an intermediate supporting base 4, and outer ends of the two parallelogram mechanisms are respectively hinged to corresponding hinge bases 1.

When hinged at the hinge bases 1, each hinge base 1 is provided with a first upper support surface 7 and a first lower support surface 8 at outer ends of upper and lower connecting rods of the parallelogram mechanism. The situation on the right side is shown in FIG. 3, and similarly, the left side may be arranged in the same manner as the right side, that is, the left side and the right side are symmetrically arranged.

When hinged with the intermediate supporting base 4, each intermediate supporting base 4 is provided with a second upper support surface 9 and a second lower support surface 10 located at inner ends of the upper and lower connecting rods of the parallelogram mechanism on both front and rear sides of the intermediate supporting base 4. The situation on the right side is shown in FIG. 3, and similarly, the left side may be arranged in the same manner as the right side, that is, the left side and the right side are symmetrically arranged.

As shown in FIG. 3, taking hinging at the right-front hinge base 1 as an example, when the parallelogram mechanism is unfolded into a flat state, the first upper support surface 7 abuts against a lower surface of the upper connecting rod 14 located on an inner side of the first hinge axis 2. The first upper support surface 7 is configured to prevent the upper connecting rod 14 from continuing to swing downward during unfolding of the parallelogram mechanism so as to provide unfolding support. Meanwhile, the first lower support surface 8 abuts against an upper surface of the lower connecting rod 15 located on an outer side of the second hinge axis 3. The first lower support surface 8 is configured to prevent a tail end of the lower connecting rod 15 from continuing to swing upward during unfolding of the parallelogram mechanism, thereby preventing the lower connecting rod 15 from continuing to swing downward so as to provide unfolding support. Accordingly, two supporting points are formed at one hinge base 1. Similarly, two supporting points are also formed at the left-front hinge base 1, the right-rear hinge base 1, and the left-rear hinge base 1, thereby forming a total of eight supporting points.

For the support at the hinge base 1, other structures may also be adopted. For example, the first lower support surface 8 may be configured to prevent a tail end of the upper connecting rod 14 from continuing to swing upward during unfolding of the parallelogram mechanism, thereby preventing the upper connecting rod 14 from continuing to swing downward to provide unfolding support. The first upper support surface 7 may abut against a lower surface of the lower connecting rod 15 located on an inner side of the second hinge axis 3, so as to prevent the lower connecting rod 15 from continuing to swing downward during unfolding of the parallelogram mechanism to provide unfolding support. In this way, two supporting points are also formed at one hinge base 1, and four hinge bases 1 together can provide eight supporting points.

Figure 9:
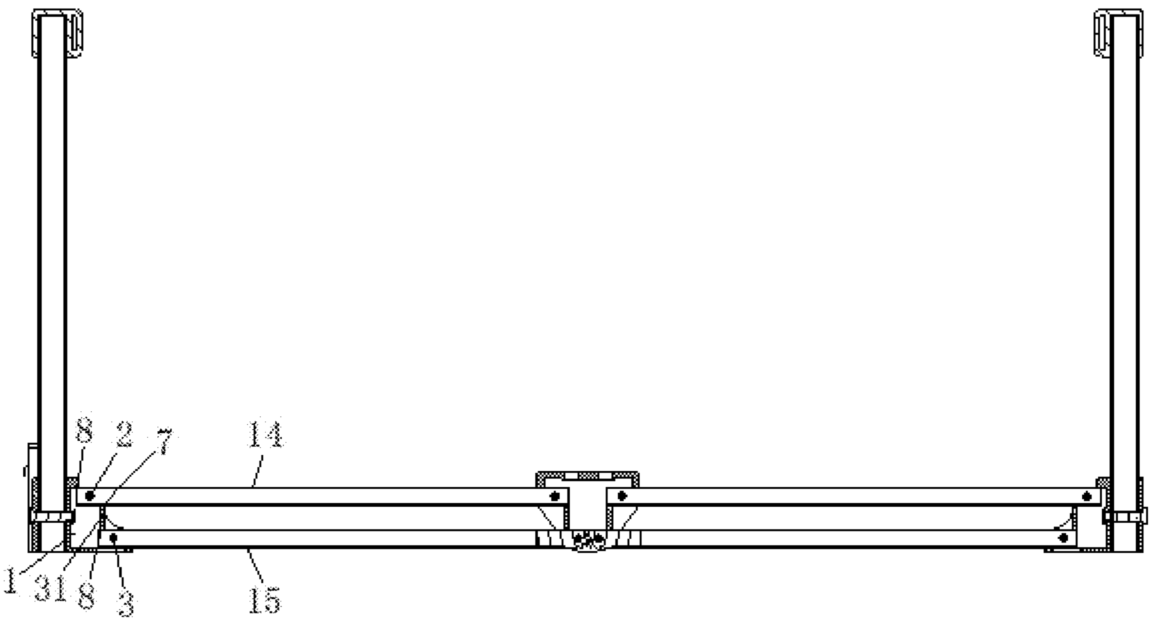
FIG. 9 is a cross-sectional view of the simplified fold-in-half wagon in the unfolded state equipped with three supporting points at hinge bases, taken along the line A-A.

As another example, as shown in FIG. 9, the first upper support surface 7 abuts against a lower surface of the upper connecting rod 14 located on an inner side of the first hinge axis 2, so as to prevent the upper connecting rod 14 from continuing to swing downward during unfolding of the parallelogram mechanism to provide unfolding support. The first lower support surface 8 abuts against an upper surface of the upper connecting rod 14 located on an outer side of the first hinge axis 2, so as to prevent a tail end of the upper connecting rod 14 from continuing to swing upward, thereby preventing the upper connecting rod 14 from continuing to swing downward and providing unfolding support. Additionally, the first lower support surface 8 abuts against an upper surface of the lower connecting rod 15 located on an outer side of the second hinge axis 3, so as to prevent a tail end of the lower connecting rod 15 from continuing to swing upward during unfolding of the parallelogram mechanism, thereby preventing the lower connecting rod 15 from continuing to swing downward to provide unfolding support. In this way, up to three supporting points may be formed at one hinge base 1, and four hinge bases 1 together can provide a total of twelve supporting points.

As yet another example, the first lower support surface 8 abuts against an upper surface of the upper connecting rod 14 located on an outer side of the first hinge axis 2, so as to prevent a tail end of the upper connecting rod 14 from continuing to swing upward during unfolding of the parallelogram mechanism, thereby preventing the upper connecting rod 14 from continuing to swing downward to provide unfolding support. The first upper support surface 7 abuts against a lower surface of the lower connecting rod 15 located on an inner side of the second hinge axis 3, so as to prevent the lower connecting rod 15 from continuing to swing downward during unfolding of the parallelogram mechanism to provide unfolding support. In addition, the first lower support surface 8 abuts against an upper surface of the lower connecting rod 15 located on an outer side of the second hinge axis 3, so as to prevent a tail end of the lower connecting rod 15 from continuing to swing upward during unfolding of the parallelogram mechanism, thereby preventing the lower connecting rod 15 from continuing to swing downward to provide unfolding support. In this way, up to three supporting points may also be formed at one hinge base 1, and four hinge bases 1 together can provide a total of twelve supporting points.

As a further example, the first upper support surface 7 abuts against a lower surface of the upper connecting rod 14 located on an inner side of the first hinge axis 2, so as to prevent the upper connecting rod 14 from continuing to swing downward during unfolding of the parallelogram mechanism. The first lower support surface 8 abuts against an upper surface of the upper connecting rod 14 located on an outer side of the first hinge axis 2, so as to prevent a tail end of the upper connecting rod 14 from continuing to swing upward during unfolding of the parallelogram mechanism, thereby preventing the upper connecting rod 14 from continuing to swing downward to provide unfolding support. The first upper support surface 7 abuts against a lower surface of the lower connecting rod 15 located on an inner side of the second hinge axis 3, so as to prevent the lower connecting rod 15 from continuing to swing downward during unfolding of the parallelogram mechanism to provide unfolding support. The first lower support surface 8 abuts against an upper surface of the lower connecting rod 15 located on an outer side of the second hinge axis 3, so as to prevent a tail end of the lower connecting rod 15 from continuing to swing upward during unfolding of the parallelogram mechanism, thereby preventing the lower connecting rod 15 from continuing to swing downward to provide unfolding support. In this way, up to four supporting points may be formed at one hinge base 1, and four hinge bases 1 together can provide a total of sixteen supporting points.

As shown in FIG. 3, taking the intermediate supporting base 4 on the right side as an example, when the parallelogram mechanism is unfolded into a flat state, the second upper support surface 9 abuts against a lower surface of the upper connecting rod 14 located on an inner side of the third hinge axis 5. The second upper support surface 9 is configured to prevent an inner end of the upper connecting rod 14 from continuing to swing downward during unfolding of the parallelogram mechanism so as to provide unfolding support. Meanwhile, the second lower support surface 10 abuts against an upper surface of the lower connecting rod 15 located on an outer side of the fourth hinge axis 6. The second lower support surface 10 is configured to prevent a portion of the lower connecting rod 15 located on the outer side of the fourth hinge axis 6 from continuing to swing upward relative to the second lower support surface 10 during unfolding of the parallelogram mechanism, thereby preventing the lower connecting rod 15 from continuing to swing downward so as to provide unfolding support. In this way, since two parallelogram mechanisms distributed in the direction from front to rear are provided at the intermediate supporting base 4, four supporting points are formed at one intermediate supporting base 4, and thus two intermediate supporting bases 4 together can provide a total of eight supporting points.

For the support at the intermediate supporting base 4, other structures may also be adopted. For example, the second lower support surface 10 abuts against an upper surface of the upper connecting rod 14 located on an outer side of the third hinge axis 5, and the second lower support surface 10 is configured to prevent a portion of the upper connecting rod 14 located on the outer side of the third hinge axis 5 from continuing to swing upward relative to the second lower support surface 10 during unfolding of the parallelogram mechanism, thereby preventing the upper connecting rod 14 from continuing to swing downward so as to provide unfolding support. The second upper support surface 9 abuts against a lower surface of the lower connecting rod 15 located on an inner side of the fourth hinge axis 6, and the second upper support surface 9 is configured to prevent an inner end of the lower connecting rod 15 from continuing to swing downward during unfolding of the parallelogram mechanism so as to provide unfolding support. In this way, four supporting points are also formed at one intermediate supporting base 4, and two intermediate supporting bases 4 together can provide a total of eight supporting points.

As another example, the second upper support surface 9 abuts against a lower surface of the upper connecting rod 14 located on an inner side of the third hinge axis 5, and the second upper support surface 9 is configured to prevent an inner end of the upper connecting rod 14 from continuing to swing downward during unfolding of the parallelogram mechanism so as to provide unfolding support. The second lower support surface 10 abuts against an upper surface of the upper connecting rod 14 located on an outer side of the third hinge axis 5, and the second lower support surface 10 is configured to prevent a portion of the upper connecting rod 14 located on the outer side of the third hinge axis 5 from continuing to swing upward relative to the second lower support surface 10 during unfolding of the parallelogram mechanism, thereby preventing the upper connecting rod 14 from continuing to swing downward so as to provide unfolding support. In addition, the second lower support surface 10 abuts against an upper surface of the lower connecting rod 15 located on an outer side of the fourth hinge axis 6, and the second lower support surface 10 is configured to prevent a portion of the lower connecting rod 15 located on the outer side of the fourth hinge axis 6 from continuing to swing upward relative to the second lower support surface 10 during unfolding of the parallelogram mechanism, thereby preventing the lower connecting rod 15 from continuing to swing downward so as to provide unfolding support. In this way, six supporting points are formed at one intermediate supporting base 4, and thus two intermediate supporting bases 4 together can provide a total of twelve supporting points.

As yet another example, the second upper support surface 9 abuts against a lower surface of the upper connecting rod 14 located on an inner side of the third hinge axis 5, and the second upper support surface 9 is configured to prevent an inner end of the upper connecting rod 14 from continuing to swing downward during unfolding of the parallelogram mechanism so as to provide unfolding support. The second upper support surface 9 also abuts against a lower surface of the lower connecting rod 15 located on an inner side of the fourth hinge axis 6, and the second upper support surface 9 is configured to prevent an inner end of the lower connecting rod 15 from continuing to swing downward during unfolding of the parallelogram mechanism so as to provide unfolding support. Meanwhile, the second lower support surface 10 abuts against an upper surface of the lower connecting rod 15 located on an outer side of the fourth hinge axis 6, and the second lower support surface 10 is configured to prevent a portion of the lower connecting rod 15 located on the outer side of the fourth hinge axis 6 from continuing to swing upward relative to the second lower support surface 10 during unfolding of the parallelogram mechanism, thereby preventing the lower connecting rod 15 from continuing to swing downward so as to provide unfolding support. In this way, six supporting points are also formed at one intermediate supporting base 4, and two intermediate supporting bases 4 together can provide a total of twelve supporting points.

As still another example, the second upper support surface 9 abuts against a lower surface of the upper connecting rod 14 located on an inner side of the third hinge axis 5, and the second upper support surface 9 is configured to prevent an inner end of the upper connecting rod 14 from continuing to swing downward during unfolding of the parallelogram mechanism so as to provide unfolding support. The second lower support surface 10 abuts against an upper surface of the upper connecting rod 14 located on an outer side of the third hinge axis 5, and the second lower support surface 10 is configured to prevent a portion of the upper connecting rod 14 located on the outer side of the third hinge axis 5 from continuing to swing upward relative to the second lower support surface 10 during unfolding of the parallelogram mechanism, thereby preventing the upper connecting rod 14 from continuing to swing downward so as to provide unfolding support. The second upper support surface 9 abuts against a lower surface of the lower connecting rod 15 located on an inner side of the fourth hinge axis 6, and the second upper support surface 9 is configured to prevent an inner end of the lower connecting rod 15 from continuing to swing downward during unfolding of the parallelogram mechanism so as to provide unfolding support. The second lower support surface 10 abuts against an upper surface of the lower connecting rod 15 located on an outer side of the fourth hinge axis 6, and the second lower support surface 10 is configured to prevent a portion of the lower connecting rod 15 located on the outer side of the fourth hinge axis 6 from continuing to swing upward relative to the second lower support surface 10 during unfolding of the parallelogram mechanism, thereby preventing the lower connecting rod 15 from continuing to swing downward so as to provide unfolding support. In this way, eight supporting points are formed at one intermediate supporting base 4, and thus two intermediate supporting bases 4 together can provide a total of sixteen supporting points.

As can be seen from the above, multiple supporting points distributed along an entire circumferential direction of the bottom frame of the folding wagon are formed in the inventive solution of the present disclosure where an organic supporting relationship is established by four hinge bases and two intermediate supporting bases.

In this embodiment, a spacing is provided between the upper connecting rod and the lower connecting rod of the parallelogram mechanism. The spacing enables the upper connecting rod 14 to have a certain height, thereby forming a certain surface with the lower connecting rod 15. Therefore, after the fabric basket 28 is installed, the fabric basket 28 together with the upper connecting rod 14 provides a certain side blocking effect.

In some embodiments, as shown in FIG. 3, the hinge base 1 is provided with a first support portion disposed between the outer end of the upper connecting rod and the outer end of the lower connecting rod of the parallelogram mechanism. An upper end of the first support portion provides a first upper support surface 7, and a lower end of the first support portion provides a first lower support surface 8. In addition, the intermediate supporting base 4 is provided, on front and rear sides thereof, with a second support portion disposed between the inner end of the upper connecting rod and the inner end of the lower connecting rod of the corresponding parallelogram mechanism. An upper end of the second support portion provides a second upper support surface 9, and a lower end of the second support portion provides a second lower support surface 10. With such a configuration, the structure is more compact, which is beneficial to reducing the overall size.

Further, the first support portion is configured as a first vertical block 31, and the first vertical block 31 is distributed between the first hinge axis 2 and the second hinge axis 3 in a front-rear direction. In addition, the second support portion is configured as a second vertical block 32, and the second vertical block 32 is distributed between the third hinge axis 5 and the fourth hinge axis 6 in the front-rear direction. By configuring the support portions as vertical blocks, when subjected to force, the first upper support surface 7 and the first lower support surface 8 counteract each other in an upper-lower direction, thereby avoiding one-sided loading and providing improved mechanical support. Moreover, this configuration is beneficial for simplifying the structure and facilitating manufacturing.

Further, the first vertical block 31 is fixedly connected to or integrally formed with the hinge base 1; and the second vertical block 32 is fixedly connected to or integrally formed with the intermediate supporting base 4. In some embodiments, the first vertical block 31 and the hinge base 1 are integrally formed by injection molding, and the second vertical block 32 and the intermediate supporting base 4 are integrally formed by injection molding. In this way, manufacturing is facilitated, costs are reduced, and weight is decreased.

In some embodiments, the intermediate supporting base 4 is provided with a blocking portion 12 at an upper side of a front end and/or a rear end of the intermediate supporting base 4, and a lower end of the blocking portion 12 provides the second lower support surface 10. As shown in FIG. 3, the blocking portion 12 is formed by bending downward, that is, the blocking portion 12 is a bent portion, and a lower end surface of the bent portion provides the second lower support surface 10. This is an optional technical solution.

Figure 4:
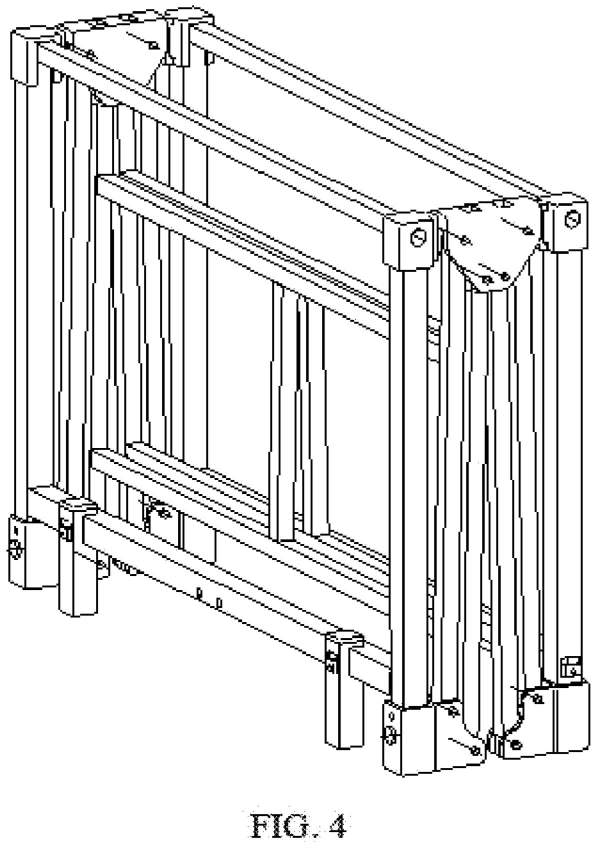
FIG. 4 is a perspective schematic view of the simplified fold-in-half wagon according to the present disclosure in a folded state.

In some embodiments, at the intermediate supporting base 4, a synchronizing gear 13 is provided between any two adjacent inner ends of the two parallelogram mechanisms, and the two parallelogram mechanisms are synchronously unfolded and folded via the synchronizing gear 13. After synchronous folding, the structure is as shown in FIG. 4.

In this embodiment, as shown in FIG. 3, a synchronizing gear 13 is provided at each of two adjacent inner ends of the lower connecting rods 15 of the two parallelogram mechanisms, and the two synchronizing gears 13 mesh with each other. Other structures may be adopted; for example, synchronizing gears 13 may be provided at adjacent inner ends of the upper connecting rods 14 of the two parallelogram mechanisms, and the synchronizing gears 13 mesh with each other.

Figure 2:
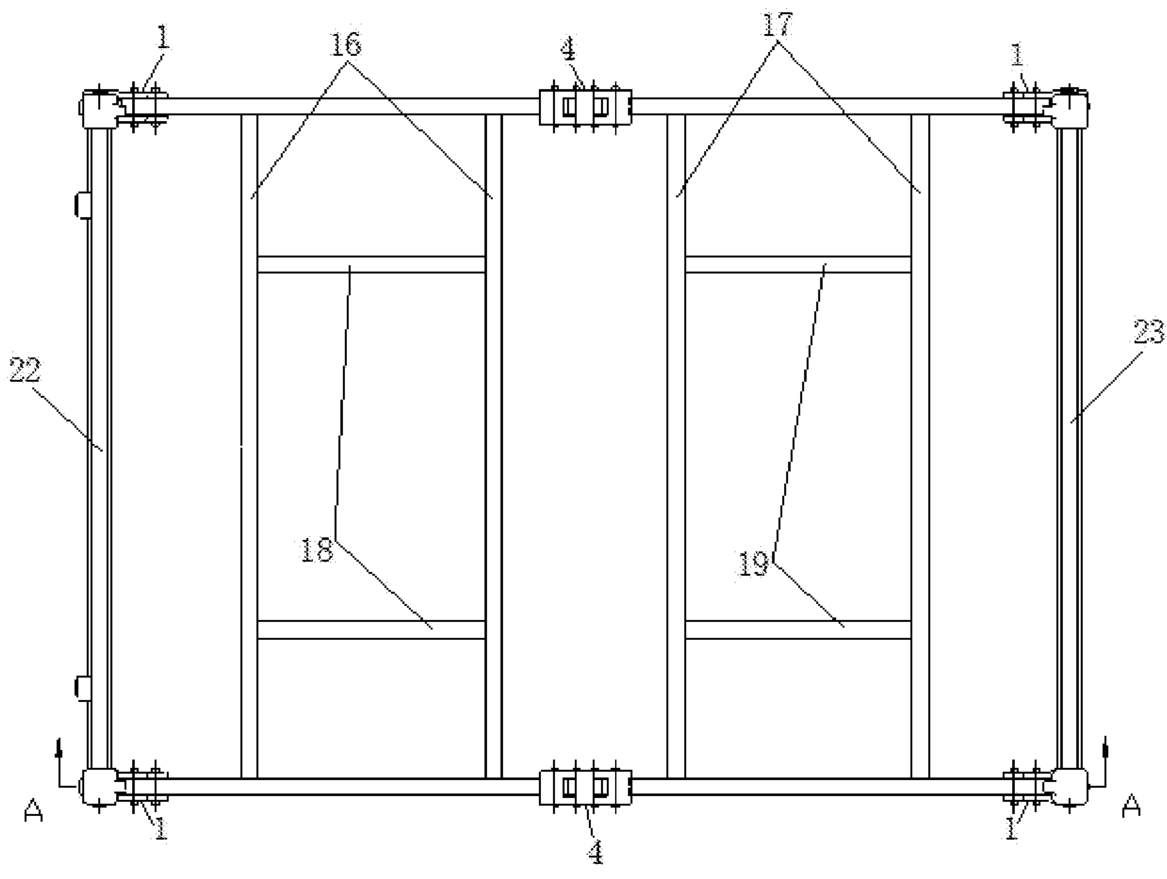
FIG. 2 is a top view of the simplified fold-in-half wagon according to the present disclosure in the unfolded state.

In some embodiments, as shown in FIGS. 1 and 2, a first bottom support rod includes one or more first cross beams 16. One end of each first cross beam 16 is connected to the lower connecting rod 15 located on a left side of a front frame, and the other end is connected to the lower connecting rod 15 located on a right side of the front frame. A second bottom support rod includes one or more second cross beams 17. One end of each second cross beam 17 is connected to the lower connecting rod 15 located on the left side of the rear frame, and the other end is connected to the lower connecting rod 15 located on the right side of the rear frame. In this way, a robust bottom frame is formed by four lower connecting rods 15 together with the corresponding first cross beams 16 and second cross beams 17, and the bottom frame provides a better supporting for items.

Further, one or more first longitudinal beams 18 are provided between two adjacent first cross beams 16; and one or more second longitudinal beams 19 are provided between two adjacent second cross beams 17.

Figure 5:
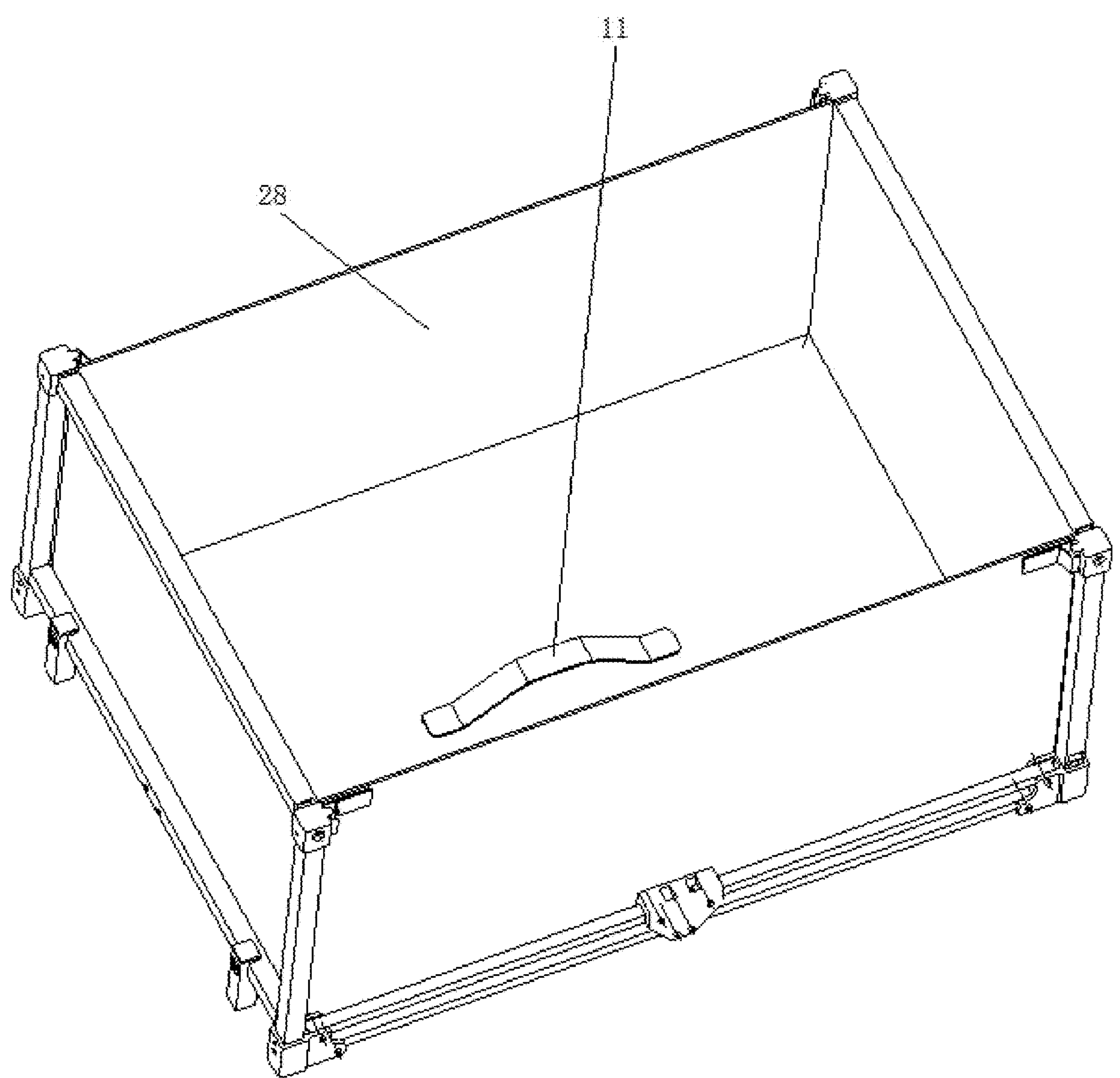
FIG. 5 is a perspective schematic view of the simplified fold-in-half wagon in the unfolded state equipped with a fabric basket, viewed from a top perspective.
Figure 6:
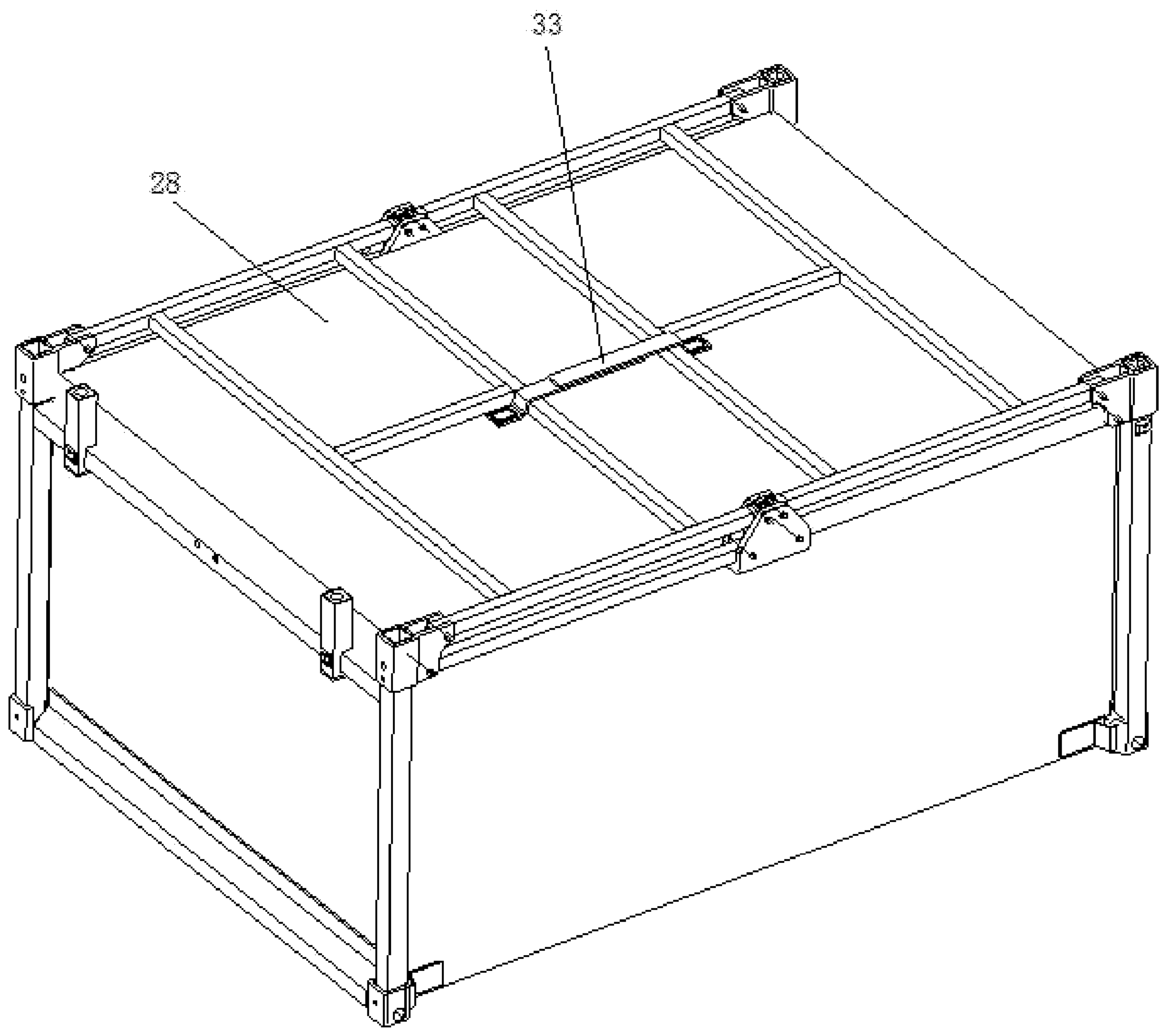
FIG. 6 is a perspective schematic view of the simplified fold-in-half wagon in the unfolded state equipped with the fabric basket, viewed from a bottom perspective.

In some embodiments, as shown in FIGS. 5 and 6, a fabric basket 28 is provided with a handle 33 at an inner bottom portion thereof, and a strap 11 at an outer bottom portion thereof. The strap 11 connects adjacent first cross beams 16 and second cross beams 17 located in a middle region. By pulling the handle 33, the fabric basket 28 pulls the first cross beams 16 and the second cross beams 17 upward via the strap 11, thereby indirectly driving the lower connecting rods 15 to move upward, so that the entire folding wagon is folded upward to achieve a folding state. Reverse movement results in unfolding.

Figure 7:
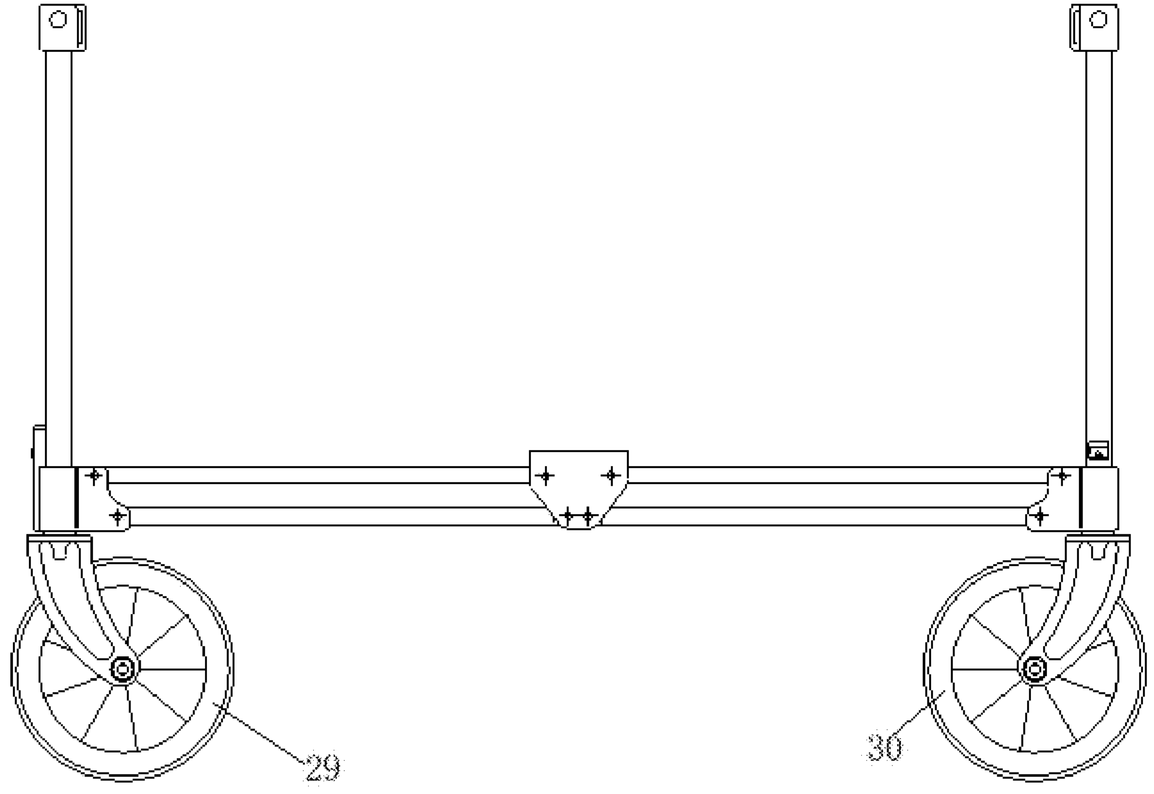
FIG. 7 is a right view of the simplified fold-in-half wagon according to the present disclosure in the unfolded state equipped with ground wheels.
Figure 8:
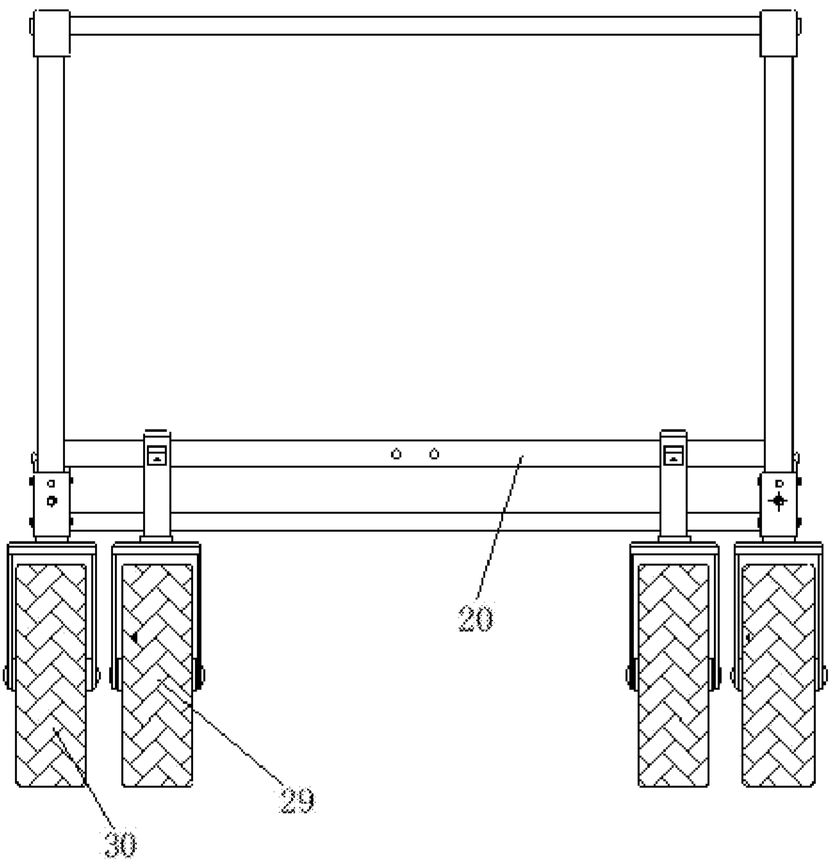
FIG. 8 is a front view of the simplified fold-in-half wagon according to the present disclosure in the unfolded state equipped with the ground wheels.

In some embodiments, as shown in FIG. 7, a front-bottom cross beam 20 is provided between the first corner column 24 and the second corner column 25, and the front-bottom cross beam 20 is provided with front ground wheels 29. Rear ground wheels 30 are provided at lower ends of the third corner column 26 and the fourth corner column 27 or at the hinge base 1. It can be seen that, in the present disclosure, the arrangement of ground wheels or casters is independent of the arrangement of the upper connecting rod 14 and the lower connecting rod 15 of the parallelogram mechanism.

In some embodiments, other structures may be adopted; for example, a front-bottom cross beam 20 is provided between the first corner column 24 and the second corner column 25, and the front-bottom cross beam 20 is provided with front ground wheels 29; and a rear-bottom cross beam 21 is provided between the third corner column 26 and the fourth corner column 27, and the rear-bottom cross beam 21 is provided with rear ground wheels 30.

Furthermore, front ground wheels 29 are provided at lower ends of the first corner column 24 and the second corner column 25 or at the hinge base 1, and a rear-bottom cross beam 21 is provided between the third corner column 26 and the fourth corner column 27, with rear ground wheels 30 provided on the rear-bottom cross beam 21.

As shown in FIGS. 1 and 4, by adaptively matching lengths of the four corner columns, the lower connecting rods 15, and the upper connecting rods 14, after folding, upper and lower end surfaces of the folding wagon can be substantially at the same height, thereby forming a final folded configuration that is nearly a rectangular block. This provides significant advantages for packaging and logistics, and is beneficial for substantially reducing packaging and logistics costs.

When understanding the present disclosure, if necessary, the above structures may be understood with reference to other embodiments and/or drawings, and details thereof are not repeated herein.

The foregoing descriptions are merely optional specific embodiments of the present disclosure. Any equivalent changes or modifications made based on the structures, features, and principles described within the scope of the present disclosure shall fall within the scope of protection of the present disclosure.

What is claimed is:

1. A simplified fold-in-half wagon, comprising four corner columns disposed at four corners of the wagon, the four corner columns comprising a first corner column, a second corner column, a third corner column, and a fourth corner column sequentially arranged along a circumferential direction of a bottom frame, wherein the first corner column and the second corner column located at a front side of the wagon serve as two side rods of a front frame, and the third corner column and the fourth corner column located at a rear side of the wagon serve as two side rods of a rear frame;

wherein each of the four corner columns is provided with a hinge base at a lower end, and the wagon further comprises a left side frame and a right side frame;

wherein the left side frame composed of two parallelogram mechanisms that are arranged one after another in a direction from front to rear is provided between two of the hinge bases located on a left side of the wagon, the right side frame composed of two parallelogram mechanisms that are arranged one after another in the direction from front to rear is provided between other two of the hinge bases located on a right side of the wagon, adjacent inner ends of the two parallelogram mechanisms are hinged by an intermediate supporting base, outer ends of the two parallelogram mechanisms are respectively hinged to respective hinge bases, and each parallelogram mechanism comprises an upper connecting rod and a lower connecting rod arranged apart from each other;

wherein four vertexes of each parallelogram mechanism are hinged about a first hinge axis, a second hinge axis, a third hinge axis and a fourth hinge axis respectively;

wherein each hinge base is provided with a first upper support surface at an outer end of the upper connecting rod of a corresponding parallelogram mechanism and a first lower support surface at an outer end of the lower connecting rod of the corresponding parallelogram mechanism, such that at least one of the following is caused when the corresponding parallelogram mechanism is unfolded and arranged horizontally: the first upper support surface abuts against a lower surface of the upper connecting rod located on an inner side of the first hinge axis to prevent the upper connecting rod from swinging downwardly further during unfolding of the corresponding parallelogram mechanism, thereby providing unfolding support; the first lower support surface abuts against an upper surface of the upper connecting rod located on an outer side of the first hinge axis to prevent a tail end of the upper connecting rod from swinging upwardly further during unfolding of the corresponding parallelogram mechanism, thereby preventing further downward swinging of the upper connecting rod to provide unfolding support; the first upper support surface abuts against a lower surface of the lower connecting rod located on an inner side of the second hinge axis to prevent the lower connecting rod from downwardly swinging further during unfolding of the corresponding parallelogram mechanism, thereby providing unfolding support; and the first lower support surface abuts against an upper surface of the lower connecting rod located on an outer side of the second hinge axis to prevent a tail end of the lower connecting rod from upwardly swinging further during unfolding of the corresponding parallelogram mechanism, thereby preventing further downward swinging of the lower connecting rod to provide unfolding support; and wherein each of a front side and a rear side of each intermediate supporting base is provided with a second upper support surface at an inner end of the upper connecting rod of a corresponding parallelogram mechanism and a second lower support surface at an inner end of the lower connecting rod of the corresponding parallelogram mechanism, such that at least one of the following is caused when the corresponding parallelogram mechanism is unfolded and arranged horizontally: the second upper support surface abuts against a lower surface of the upper connecting rod located on an inner side of the third hinge axis to prevent the inner end of the upper connecting rod from downwardly swinging further during unfolding of the corresponding parallelogram mechanism to provide unfolding support; the second lower support surface abuts against an upper surface of the upper connecting rod located on an outer side of the third hinge axis to prevent a portion of the upper connecting rod located on the outer side of the third hinge axis from upwardly swinging further relative to the second lower support surface during unfolding of the corresponding parallelogram mechanism, thereby preventing further downward swinging of the upper connecting rod to provide unfolding support; the second upper support surface abuts against a lower surface of the lower connecting rod located on an inner side of the fourth hinge axis to prevent the inner end of the lower connecting rod from downwardly swinging further during unfolding of the corresponding parallelogram mechanism to provide unfolding support; and the second lower support surface abuts against an upper surface of the lower connecting rod located on an outer side of the fourth hinge axis to prevent a portion of the lower connecting rod located on the outer side of the fourth hinge axis from upwardly swinging further relative to the second lower support surface during unfolding of the corresponding parallelogram mechanism, thereby preventing further downward swinging of the lower connecting rod to provide unfolding support.

2. The simplified fold-in-half wagon according to claim 1, wherein each hinge base is provided with a first support portion disposed between the outer end of the upper connecting rod and the outer end of the lower connecting rod of the corresponding parallelogram mechanism, an upper end of the first support portion provides the first upper support surface, and a lower end of the first support portion provides the first lower support surface; and wherein each of the front side and the rear side of each intermediate supporting base is provided with a second support portion disposed between the inner end of the upper connecting rod and the inner end of the lower connecting rod of the corresponding parallelogram mechanism, an upper end of the second support portion provides the second upper support surface, and a lower end of the second support portion provides the second lower support surface.

3. The simplified fold-in-half wagon according to claim 2, wherein the first support portion is configured as a first vertical block arranged in the direction from front to rear between the first hinge axis and the second hinge axis, and the second support portion is configured as a second vertical block arranged in the direction from front to rear between the third hinge axis and the fourth hinge axis.

4. The simplified fold-in-half wagon according to claim 3, wherein the first vertical block is fixedly connected to or integrally formed with a corresponding hinge base, and the second vertical block is fixedly connected to or integrally formed with a corresponding intermediate supporting base.

5. The simplified fold-in-half wagon according to claim 1, wherein each of a front end and a rear end of each intermediate supporting base is provided with a blocking portion on an upper side, and a lower end of the blocking portion provides the second lower support surface.

6. The simplified fold-in-half wagon according to claim 1, wherein each intermediate supporting base is provided a synchronizing gear between any adjacent inner ends of the two parallelogram mechanisms, such that the two parallelogram mechanisms are synchronously unfoldable and foldable via the synchronizing gear.

7. The simplified fold-in-half wagon according to claim 1, wherein the bottom frame comprises a first bottom support rod comprising one or more first cross beams, one end of each first cross beam is connected to a lower connecting rod located adjacent to the front frame on the left side of the wagon, and an other end of each first cross beam is connected to a lower connecting rod located adjacent to the front frame on the right side of the wagon; and wherein the bottom frame further comprises a second bottom support rod comprising one or more second cross beams, one end of each second cross beam is connected to a lower connecting rod located adjacent to the rear frame on the left side of the wagon, and an other end of each second cross beam is connected to a lower connecting rod located adjacent to the rear frame on the right side of the wagon.

8. The simplified fold-in-half wagon according to claim 7, wherein one or more first longitudinal beams are provided between adjacent first cross beams, and one or more second longitudinal beams are provided between adjacent second cross beams.

9. The simplified fold-in-half wagon according to claim 1, wherein a front-bottom cross beam is provided between the first corner column and the second corner column, and the front-bottom cross beam is provided with front ground wheels; and/or wherein a rear-bottom cross beam is provided between the third corner column and the fourth corner column, and the rear-bottom cross beam is provided with rear ground wheels.

10. The simplified fold-in-half wagon according to claim 9, wherein a front-top cross beam is provided between the first corner column and the second corner column, and the front-top cross beam, the first corner column, the second corner column, and the front-bottom cross beam form the rectangular front frame; and wherein a rear-top cross beam is provided between the third corner column and the fourth corner column, the rear-top cross beam, the third corner column, the fourth corner column, and the rear-bottom cross beam form the rectangular rear frame.

* * * * *